US012075845B2

(12) United States Patent
Fang

(10) Patent No.: US 12,075,845 B2
(45) Date of Patent: Sep. 3, 2024

(54) AEROSOL ATOMIZATION DEVICE, TEST DEVICE, CONTROL METHOD THEREFOR, AND CONTROL APPARATUS THEREOF

(71) Applicant: SHENZHEN SMOORE TECHNOLOGY LIMITED, Guangdong (CN)

(72) Inventor: Weiming Fang, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 150 days.

(21) Appl. No.: 18/079,280

(22) Filed: Dec. 12, 2022

(65) Prior Publication Data

US 2023/0106748 A1 Apr. 6, 2023

Related U.S. Application Data

(63) Continuation of application No. PCT/CN2021/084327, filed on Mar. 31, 2021.

(30) Foreign Application Priority Data

Jun. 18, 2020 (CN) ........................ 202010559531.X

(51) Int. Cl.
*G05B 15/02* (2006.01)
*A24F 40/53* (2020.01)
(Continued)

(52) U.S. Cl.
CPC .............. *A24F 40/80* (2020.01); *A24F 40/53* (2020.01); *A24F 40/57* (2020.01); *A24F 40/60* (2020.01); *G05B 15/02* (2013.01); *H05B 1/0244* (2013.01)

(58) Field of Classification Search
CPC ...................................................... G01R 31/18
See application file for complete search history.

(56) References Cited

U.S. PATENT DOCUMENTS 4,442,528 A 4/1984 Fukuda
2013/0002316 A1 1/2013 Goh et al.
(Continued)

FOREIGN PATENT DOCUMENTS

CN 203597405 U 5/2014
CN 104664605 A 6/2015
(Continued)

OTHER PUBLICATIONS

Chinese Patent Office, Office Action in Chinese Patent Application No. 202010559531.X (May 24, 2023).
(Continued)

*Primary Examiner* — Tung X Nguyen
(74) *Attorney, Agent, or Firm* — Leydig, Voit & Mayer, Ltd.

(57) ABSTRACT

An aerosol vaporization device includes: a trigger signal receiving unit for receiving a trigger signal; a detection unit for detecting an operating parameter, the operating parameter including at least one measured parameter of the aerosol vaporization device; a control unit for obtaining the operating parameter fed back by the detection unit when receiving the trigger signal transmitted by the trigger signal receiving unit and outputting a pulse signal after encoding the operating parameter; and a light-emitting diode (LED) unit for modulating a display level according to the pulse signal transmitted by the control unit and output a pulse display level, the display level representing an operating state of the aerosol vaporization device, the pulse display
(Continued)

level being provided to a test device for detection and to obtain the operating parameter according to the pulse display level.

17 Claims, 8 Drawing Sheets

(51) Int. Cl.

| | |
|---|---|
| ***A24F 40/57*** | (2020.01) |
| ***A24F 40/60*** | (2020.01) |
| ***A24F 40/80*** | (2020.01) |
| ***H05B 1/02*** | (2006.01) |

(56) References Cited

U.S. PATENT DOCUMENTS

2017/0127726 A1 5/2017 Xiang
2020/0065200 A1* 2/2020 Uttley ........................ G06F 1/06
2020/0393527 A1* 12/2020 Biber .................... G01R 33/288

FOREIGN PATENT DOCUMENTS

CN 107072316 A 8/2017
CN 107231192 A 10/2017
CN 108135267 A 6/2018
CN 109068749 A 12/2018
CN 110037356 A 7/2019
CN 110801055 A 2/2020
CN 111246763 A 6/2020
CN 111913058 A 11/2020

OTHER PUBLICATIONS

Patent Cooperation Treaty, International Search Report, International Application No. PCT/CN2021/084327 (Jun. 30, 2021).
Patent Cooperation Treaty, Written Opinion of the International Searching Authority, International Application No. PCT/CN2021/084327 (Jun. 30, 2021).
Chinese Patent Office, First Office Action in Chinese Patent Application No. 202010559531.X (Oct. 21, 2022).

* cited by examiner

```
                                    S210
┌─────────────────────────────────────┐
│       Obtain a detection signal     │
└─────────────────────────────────────┘
                  │
                  ▼               S220
┌─────────────────────────────────────┐
│     Demodulate the detection signal │
└─────────────────────────────────────┘
                  │
                  ▼               S230
┌─────────────────────────────────────┐
│ Decode the pulse signal to obtain the operating parameter │
│         of the aerosol vaporization device                │
└─────────────────────────────────────┘
```

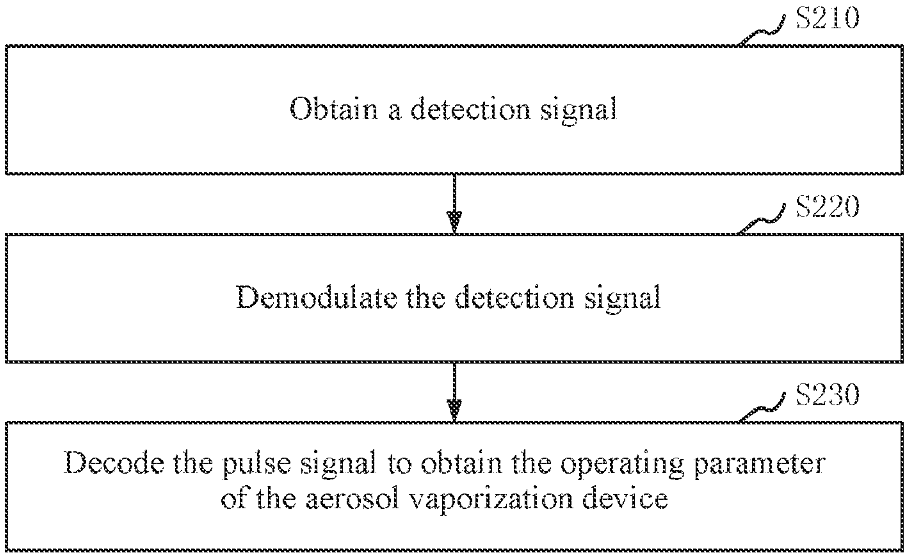

FIG. 9

```
                                    S240
┌─────────────────────────────────────┐
│ Transmit a trigger control signal to the trigger module │
└─────────────────────────────────────┘
                  │
                  ▼               S210
┌─────────────────────────────────────┐
│       Obtain a detection signal     │
└─────────────────────────────────────┘
                  │
                  ▼               S220
┌─────────────────────────────────────┐
│     Demodulate the detection signal │
└─────────────────────────────────────┘
                  │
                  ▼               S230
┌─────────────────────────────────────┐
│ Decode the pulse signal to obtain the operating parameter │
│         of the aerosol vaporization device                │
└─────────────────────────────────────┘
```

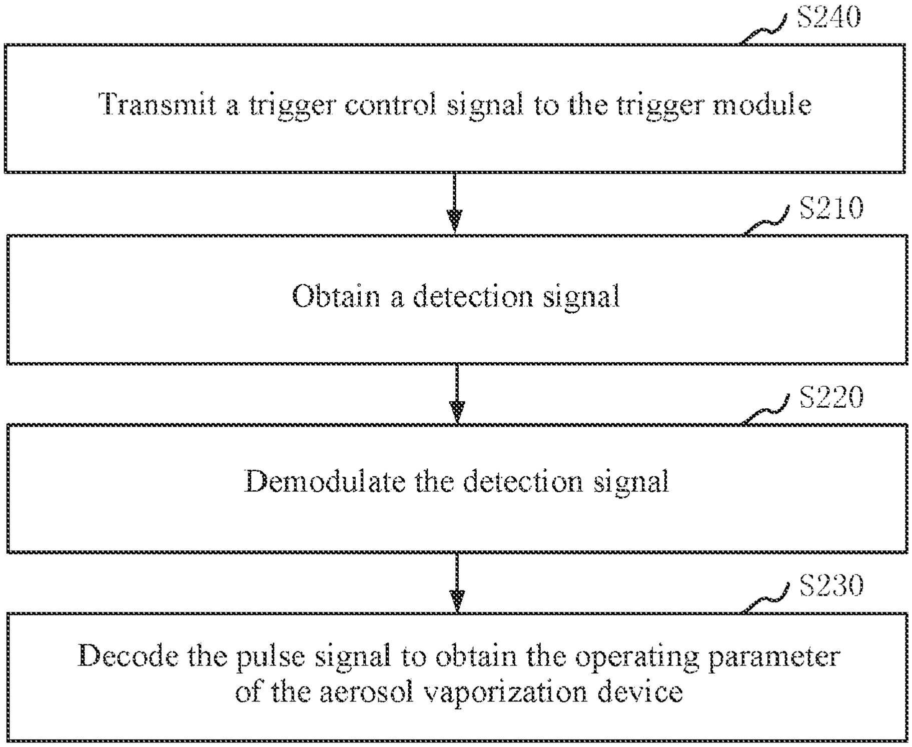

FIG. 10

```
Aerosol vaporization device
control apparatus 300
            ┌── 310
    Operating parameter
    obtaining module
            ┌── 320
    Encoding module
            ┌── 330
    Pulse signal
    transmission module
```

```
Aerosol vaporization
device test apparatus
            ┌── 410
    Detection signal
    obtaining module
            ┌── 420
    Demodulation module
            ┌── 430
    Decoding module
```

AEROSOL ATOMIZATION DEVICE, TEST DEVICE, CONTROL METHOD THEREFOR, AND CONTROL APPARATUS THEREOF

CROSS-REFERENCE TO PRIOR APPLICATION

This application is a continuation of International Patent Application No. PCT/CN2021/084327, filed on Mar. 31, 2021, which claims priority to Chinese Patent Application No. 202010559531.X, filed on Jun. 18, 2020. The entire disclosure of both applications is hereby incorporated by reference herein.

FIELD

This application relates to the field of vaporization technologies, and in particular, to an aerosol vaporization device, a test device, and a control method and a control apparatus thereof.

BACKGROUND

With the development of vaporization technologies, vaporization devices applied to various scenarios are provided, including a medical vaporization device, a household vaporization device, a coal-burning vaporization device, and an e-cigarette.

During production of a vaporization device, parameter tests need to be performed to detect the quality of the product, to ensure the quality of the manufactured product. An existing method is to test the vaporization device by using an external test instrument (for example, a multimeter) through a test fixture, but there are problems such as a low test efficiency and measurement accuracy affected by a contact error. Specifically, for a disposable vaporization device, because a product form thereof does not include an interface for testing, only basic functions can be tested and basic parameters cannot be tested after the product is assembled, which has a quality risk.

SUMMARY

In an embodiment, the present invention provides an aerosol vaporization device, comprising: a trigger signal receiving unit configured to receive a trigger signal; a detection unit configured to detect an operating parameter, the operating parameter comprising at least one measured parameter of the aerosol vaporization device; a control unit configured to obtain the operating parameter fed back by the detection unit when receiving the trigger signal transmitted by the trigger signal receiving unit and output a pulse signal after encoding the operating parameter; and a light-emitting diode (LED) unit configured to modulate a display level according to the pulse signal transmitted by the control unit and output a pulse display level, the display level representing an operating state of the aerosol vaporization device, the pulse display level being provided to a test device for detection and to obtain the operating parameter according to the pulse display level.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 9 is a schematic flowchart of an aerosol vaporization device test method according to an embodiment of this application;

FIG. 10 is a schematic flowchart of an aerosol vaporization device test method according to another embodiment of this application;

DETAILED DESCRIPTION

Figure 1:
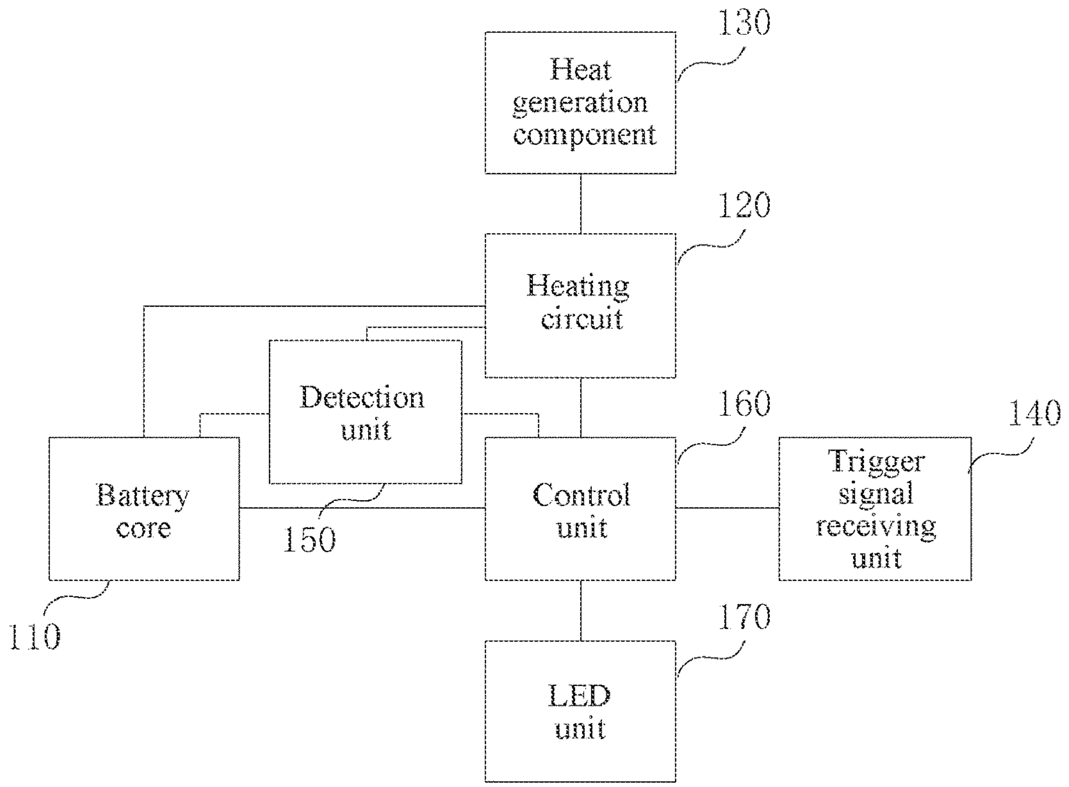
FIG. 1 is a schematic structural diagram of an aerosol vaporization device according to an embodiment of this application.

In an embodiment, the present invention provides an aerosol vaporization device, a test device, and a control method and a control apparatus thereof that can facilitate basic parameter tests for the foregoing technical problems.

An aerosol vaporization device is provided, including:

a trigger signal receiving unit, configured to receive a trigger signal;

a detection unit, configured to detect an operating parameter, where the operating parameter includes at least one measured parameter of the aerosol vaporization device;

a control unit, configured to obtain the operating parameter fed back by the detection unit when receiving the trigger signal transmitted by the trigger signal receiving unit and output a pulse signal after encoding the operating parameter; and a light-emitting diode (LED) unit, configured to modulate a display level according to the pulse signal transmitted by the control unit and output a pulse display level, where the display level is used for representing an operating state of the aerosol vaporization device; and the pulse display level is provided to a test device for detection and to obtain the operating parameter according to the pulse display level.

According to the aerosol vaporization device, the operating parameter of the aerosol vaporization device detected by the detection unit is obtained by the control unit when a trigger signal is received, and a pulse signal is output to the LED unit after the operating parameter is encoded, to modulate a display level of the LED unit that represents the operating state of the aerosol vaporization device, so that the LED unit is caused to output a pulse display level to a test device for detection. Therefore, the test device can obtain the operating parameter according to the pulse display level without an interface for detection, so that the operating parameter of the aerosol vaporization device can be detected conveniently and accurately.

In an embodiment, the aerosol vaporization device further includes:

a heating circuit, configured to drive a heat generation component to generate heat; and the control unit being further configured to output a heating signal to the heating circuit when receiving the trigger signal, where the heating signal is used for controlling the heating circuit to drive the heat generation component to generate heat.

In an embodiment, the control unit is further configured to control the LED unit to output the display level when receiving the trigger signal.

In an embodiment, the pulse signal is a high-frequency pulse signal.

In an embodiment, the operating parameter further includes a resistance value of the heat generation component and/or an output power of the heating circuit; and the resistance value of the heat generation component and the output power of the heating circuit are calculated by the control unit according to the operating parameter fed back by the detection unit.

In an embodiment, the trigger signal receiving unit includes a microphone.

A test device is provided, configured to test the aerosol vaporization device according to any one of the foregoing embodiments, the test device including:

an optical detection module, configured to detect the pulse display level output by the LED unit of the aerosol vaporization device and output a detection signal according to the pulse display level; and a test control module, configured to receive the detection signal transmitted by the optical detection module and obtain the operating parameter of the aerosol vaporization device according to the detection signal.

According to the test device, the pulse display level output by the LED unit of the aerosol vaporization device is detected by the optical detection module, and a detection signal is output to the test control module according to the pulse display level. The operating parameter of the aerosol vaporization device is obtained by the test control module after the detection signal is processed without an interface for detection, so that the operating parameter of the aerosol vaporization device can be detected conveniently and accurately.

In an embodiment, the test device further includes:

a trigger module, configured to input a trigger signal to the trigger signal receiving unit of the aerosol vaporization device; and the test control module being further configured to control the trigger module to input the trigger signal to the trigger signal receiving unit.

In an embodiment, the test device further includes:

a display module, configured to display the operating parameter transmitted by the test control module.

An aerosol vaporization device control method is provided, applicable to the aerosol vaporization device according to any one of the foregoing embodiments, the method including:

obtaining an operating parameter fed back by the detection unit when receiving a trigger signal, where the detection unit is configured to detect the operating parameter of the aerosol vaporization device; and the operating parameter includes at least one measured parameter of the aerosol vaporization device;

encoding the operating parameter to obtain a pulse signal; and transmitting the pulse signal to the LED unit, where the pulse signal is used for controlling the LED unit to modulate a display level and output a pulse display level; the display level is used for representing an operating state of the aerosol vaporization device; and the pulse display level is provided to a test device for detection and to obtain the operating parameter according to the pulse display level.

According to the aerosol vaporization device control method, when a trigger signal is received, an operating parameter detected by the detection unit is obtained, a pulse signal is obtained after the operating parameter is encoded, the pulse signal is transmitted to the LED unit to control the LED unit to modulate a display level output by the LED unit, so that the LED unit outputs a pulse display level to a test device for detection, and the test device obtains the operating parameter according to the pulse display level.

In an embodiment, the operating parameter further includes a resistance value of the heat generation component and/or an output power of the heating circuit; and the method further comprises:

calculating the resistance value of the heat generation component and the output power of the heating circuit according to the operating parameter fed back by the detection unit.

An aerosol vaporization device test method is provided, applicable to the test device according to any one of the foregoing embodiments, the method including:

obtaining a detection signal, where the detection signal is an electrical signal output by the optical detection module according to the pulse display level output by the LED unit of the aerosol vaporization device;

demodulating the detection signal to obtain a pulse signal corresponding to the pulse display level; and decoding the pulse signal to obtain the operating parameter of the aerosol vaporization device.

According to the aerosol vaporization device test method, a detection signal output according to the pulse display level output by the LED unit of the aerosol vaporization device is obtained through the optical detection module; and the detection signal is demodulated to obtain a pulse signal corresponding to the pulse display level, and the pulse signal is then decoded to obtain the operating parameter of the aerosol vaporization device.

In an embodiment, before the obtaining a detection signal, the method further includes:

transmitting a trigger control signal to the trigger module, where the trigger control signal is used for controlling the trigger module to input a trigger signal to the trigger signal receiving unit of the aerosol vaporization device.

An aerosol vaporization device control apparatus is provided, applicable to the aerosol vaporization device according to any one of the foregoing embodiments, the apparatus including:

an operating parameter obtaining module, configured to obtain an operating parameter fed back by the detection unit when receiving a trigger signal, where the detection unit is configured to detect the operating parameter of the aerosol vaporization device; and the operating parameter includes at least one measured parameter of the aerosol vaporization device;

an encoding module, configured to encode the operating parameter to obtain a pulse signal; and a pulse signal transmission module, configured to transmit the pulse signal to the LED unit, where the pulse signal is used for controlling the LED unit to modulate a display level and output a pulse display level; the display level is used for representing an operating state of the aerosol vaporization device; and the pulse display level is provided to a test device for detection and to obtain the operating parameter according to the pulse display level.

An aerosol vaporization device test apparatus is provided, applicable to the test device according to any one of the foregoing embodiments, the apparatus including:

a detection signal obtaining module, configured to obtain a detection signal, where the detection signal is an electrical signal output by the optical detection module according to the pulse display level output by the LED unit of the aerosol vaporization device;

a demodulation module, configured to demodulate the detection signal to obtain a pulse signal corresponding to the pulse display level; and a decoding module, configured to decode the pulse signal to obtain the operating parameter of the aerosol vaporization device.

A computer device is provided, including a memory and a processor, the memory storing a computer program, the processor, when executing the computer program, implementing the steps of the foregoing method.

A computer-readable storage medium is provided, storing a computer program, the computer program, when executed by a processor, causing the processor to implement the steps of the foregoing method.

To help understand this application, the following describes this application more fully with reference to the related accompanying drawings. Embodiments of this application are provided in the accompanying drawings. However, this application may be implemented in many different forms, and is not limited to the embodiments described in this specification. On the contrary, the embodiments are provided to make the disclosed content of this application more comprehensive and thorough.

Unless otherwise defined, meanings of all technical and scientific terms used in this specification are the same as that usually understood by a person skilled in the technical field to which this application belongs. In this application, terms used in the specification of this application are merely intended to describe objectives of the specific embodiments, but are not intended to limit this application.

It may be understood that terms "first", "second" and the like used in this application may be used to describe various elements in this specification, but the elements are not limited by the terms. The terms are merely used for distinguishing a first element from another element. For example, a first light-emitting diode (LED) and a second LED may be the same LED or may be different LEDs. Without departing from the scope of this application, the first LED may be referred to as the second LED, and similarly, the second LED may be referred to as the first LED.

When used herein, the singular forms "a", "an" and "the" may also include the plural forms, unless otherwise clearly indicated in the context. It should be further understood that, the terms "include/contain" and "comprise" specify the presence of stated features, entireties, steps, operations, components, parts, or a combination thereof, but do not exclude the presence or addition of one or more other features, entireties, steps, operations, components, parts, or a combination thereof. In addition, the term "and/or" used in this specification includes any and all combinations of related listed items.

Figure 2:
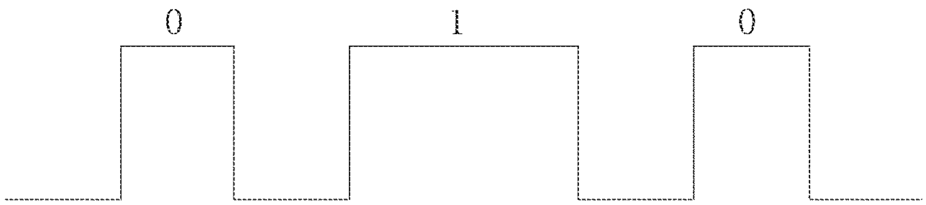
FIG. 2 is a schematic diagram of a pulse signal according to an embodiment of this application.
Figure 3:
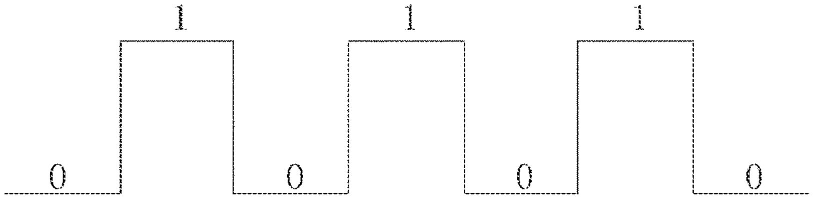
FIG. 3 is a schematic diagram of a pulse signal according to another embodiment of this application.

In an embodiment, as shown in FIG. 1, an aerosol vaporization device 100 is provided, including a battery core 110, a heating circuit 120, and a heat generation component 130. The aerosol vaporization device 100 further includes:

a trigger signal receiving unit 140, configured to receive a trigger signal;

a detection unit 150, configured to detect an operating parameter, where the operating parameter includes at least one measured parameter of the aerosol vaporization device;

a control unit 160, configured to obtain the operating parameter fed back by the detection unit 150 when receiving the trigger signal transmitted by the trigger signal receiving unit 140 and output a pulse signal after encoding the operating parameter; and an LED unit 170, configured to modulate a display level according to the pulse signal transmitted by the control unit 160 and output a pulse display level, where the display level is used for representing an operating state of the aerosol vaporization device; and the pulse display level is provided to a test device 200 for detection and to obtain the operating parameter according to the pulse display level. The battery core 110 is configured to supply power to the vaporization device. The trigger signal is a signal trigger operation of the aerosol vaporization device 100, which may be a signal triggering startup of the aerosol vaporization device 100 or the beginning of vaporization. Specifically, the trigger signal may be inputted by a user or may be inputted by the test device. The detection unit 150 is configured to detect the operating parameter of the aerosol vaporization device 100, namely, measured parameters of elements and circuits in the aerosol vaporization device 100. Specifically, the operating parameter may include a measured parameter of the battery core 110 and/or a measured parameter of the heat generation component 130, for example, a temperature of the battery core 110, a voltage of the battery core 110, and a resistance value, a current, or a voltage of the heat generation component 130. According to parameters that need to be measured, the detection unit 150 may include one or more measurement modules. When the control unit 160 receives the trigger signal, the heat generation component 130 starts to generate heat, and the control unit 160 obtains the operating parameter detected by the detection unit 150 and encodes the operating parameter to obtain a pulse signal and outputs the pulse signal to the LED unit 170. In some embodiments, in a process that the control unit 160 encodes the operating parameter, 0 or 1 may be represented by using different time lengths of a level (as shown in FIG. 2), or 0 or 1 may be represented by using a conversion direction between high and low levels (as shown in FIG. 3). In some embodiments, the trigger signal receiving unit 140 may be a mems sensor; the detection unit 150 may be a temperature detection circuit, a voltage detection circuit, or a current detection circuit; and the control unit 160 may be a microcontroller (MCU) or an application-specific integrated circuit (ASIC).

In some embodiments, the LED unit 170 may be set to output the display level after startup or output the display level after heating is started as required; or may be set to output the display level after a preset heating time. The preset time is a duration from the startup/heating of the aerosol vaporization device 100 to a time at which aerosols start to be generated. According to a set operating state corresponding to outputting a display level, the control unit 160 controls the LED unit 170 to output the display level when recognizes that the aerosol vaporization device is in the operating state. After the control unit 160 outputs the pulse signal to the LED unit 170, the LED unit 170 outputs a pulse display level obtained by modulating the display level.

The test device has a capability of converting a recognized pulse optical signal into an electrical signal, so that the operating parameter of the aerosol vaporization device 100 can be extracted by recognizing the pulse display level.

According to the aerosol vaporization device 100, the operating parameter of the aerosol vaporization device detected by the detection unit 150 is obtained by the control unit 160 when a trigger signal is received, and a pulse signal is output to the LED unit 170 after the operating parameter is encoded, to modulate a display level of the LED unit 170 that represents the operating state of the aerosol vaporization device 100, so that the LED unit 170 is caused to output a pulse display level to a test device for detection. Therefore, the test device can obtain the operating parameter according to the pulse display level without an interface for detection, so that the operating parameter of the aerosol vaporization device 100 can be detected conveniently and accurately.

In an embodiment, the aerosol vaporization device further includes:

a heating circuit 120, configured to drive a heat generation component 130 to generate heat; and the control unit 160 being further configured to output a heating signal to the heating circuit 120 when receiving the trigger signal, where the heating signal is used for controlling the heating circuit 120 to drive the heat generation component 130 to generate heat.

The control unit 160 outputs a drive signal when receiving the trigger signal, and the drive signal is a pulse width modulation (PWM) signal used for driving the heating circuit 120 to control the heat generation component 130 to generate heat according to the PWM signal.

In an embodiment, the control unit 160 is further configured to control the LED unit to output the display level when receiving the trigger signal.

In an embodiment, the pulse signal is a high-frequency pulse signal.

A frequency of the high-frequency pulse signal is greater than a frequency that can be recognized by human eyes, so that the user cannot observe flashes of the pulse display level output by the LED unit 170, visual perception during use of the user is not affected, and the user can still normally recognize the operating state of the aerosol vaporization device 100 according to the pulse display level output by the LED unit 170.

In an embodiment, the operating parameter further includes a resistance value of the heat generation component 130 and/or an output power of the heating circuit 120.

The resistance value of the heat generation component 130 and the output power of the heating circuit 120 are calculated by the control unit 160 according to the operating parameter fed back by the detection unit 150.

Because the resistance value of the heat generation component 130 and the output power of the heating circuit 120 can be hardly directly obtained through detection of the detection unit 150 of the aerosol vaporization device 100, the control unit 160 may calculate the resistance value and the output power according to the operating parameter fed back by the detection unit 150. Therefore, according to a test requirement, the control unit 160 may calculate the resistance value of the heat generation component 130 and the output power of the heating circuit 120 according to the measured parameters of the battery core 110 and the heat generation component 130.

In an embodiment, the trigger signal receiving unit 140 includes a microphone.

If the aerosol vaporization device 100 is an e-cigarette or a respirable medical vaporization device, the trigger signal receiving unit 140 includes a microphone. The microphone obtains a trigger signal through an airflow generated when the device is inhaled by the user during inhalation or breathing.

Figure 4:
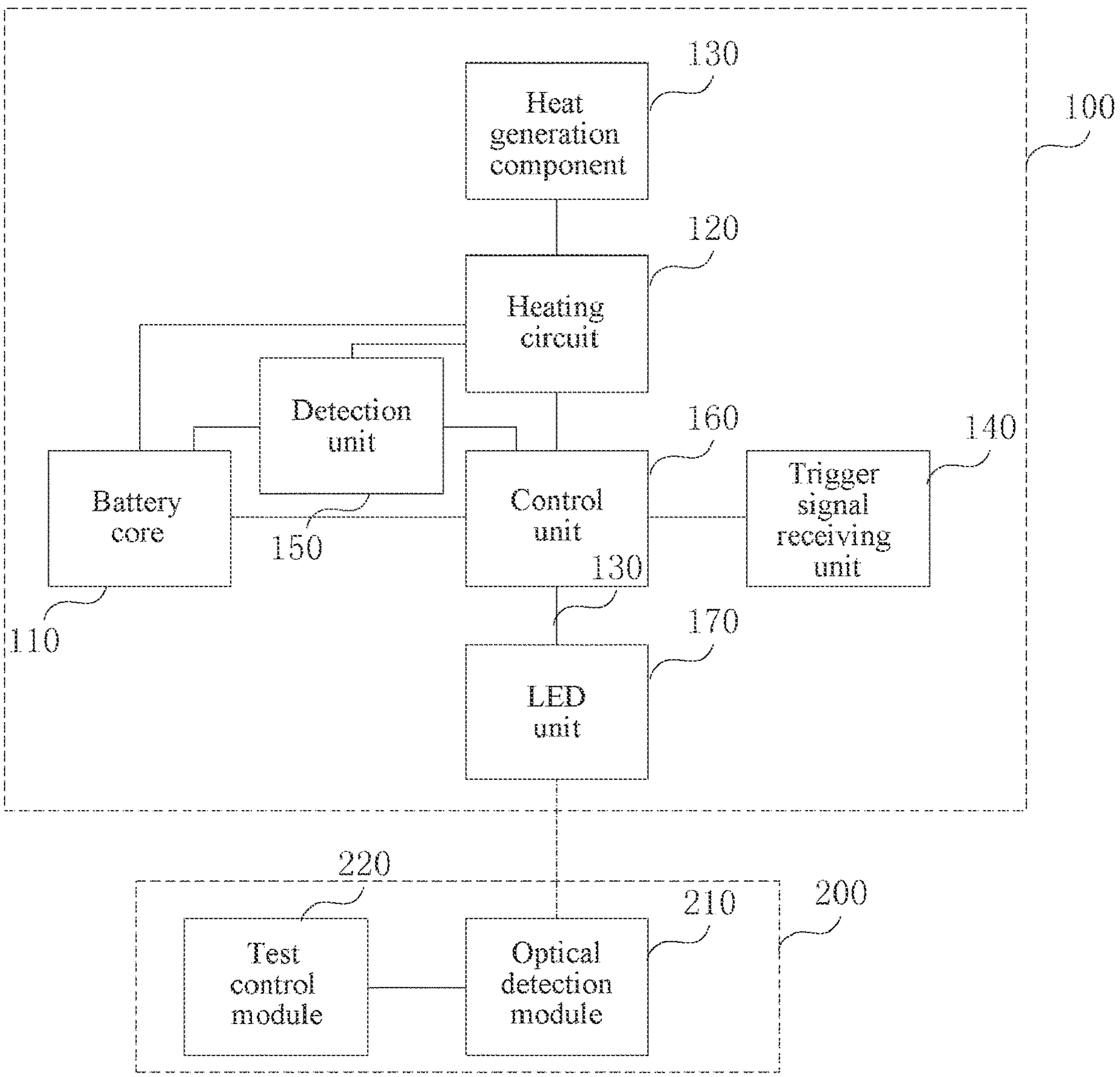
FIG. 4 is a schematic structural diagram of a test device according to an embodiment of this application.

In an embodiment, as shown in FIG. 4, a test device 200 is provided, applicable to the aerosol vaporization device 100 according to any one of the foregoing embodiments. The test device 200 includes:

an optical detection module 210, configured to detect the pulse display level output by the LED unit 170 of the aerosol vaporization device 100 and output a detection signal according to the pulse display level; and a test control module 220, configured to receive the detection signal transmitted by the optical detection module 210 and obtain the operating parameter of the aerosol vaporization device 100 according to the detection signal.

The optical detection module 210 is configured to detect the pulse display level, convert the pulse display level in an optical signal form into a detection signal in an electrical signal form, and output the detection signal to the test control module 220. In an embodiment, the optical detection module 210 may be an automated optical inspection (AOI) optical test instrument. The test control module 220 is an operating module having data processing and signal receiving and transmission capabilities, which can demodulate and decode the detection signal, to extract the operating parameter of the aerosol vaporization device 100. The test control module 220 demodulates the detection signal to obtain a pulse signal and then decodes the pulse signal to obtain the operating parameter of the aerosol vaporization device 100. In some embodiments, the test control module 220 may be a MCU or an ASIC.

According to the test device 200, the pulse display level output by the LED unit 170 of the aerosol vaporization device 100 is detected by the optical detection module 210, and a detection signal is then output to the test control module 220 according to the pulse display level; and the operating parameter of the aerosol vaporization device 100 is obtained after the detection signal is processed by the test control module 220. In this way, the operating parameter of the aerosol vaporization device 100 can be conveniently and accurately detected without an interface for detection.

Figure 5:
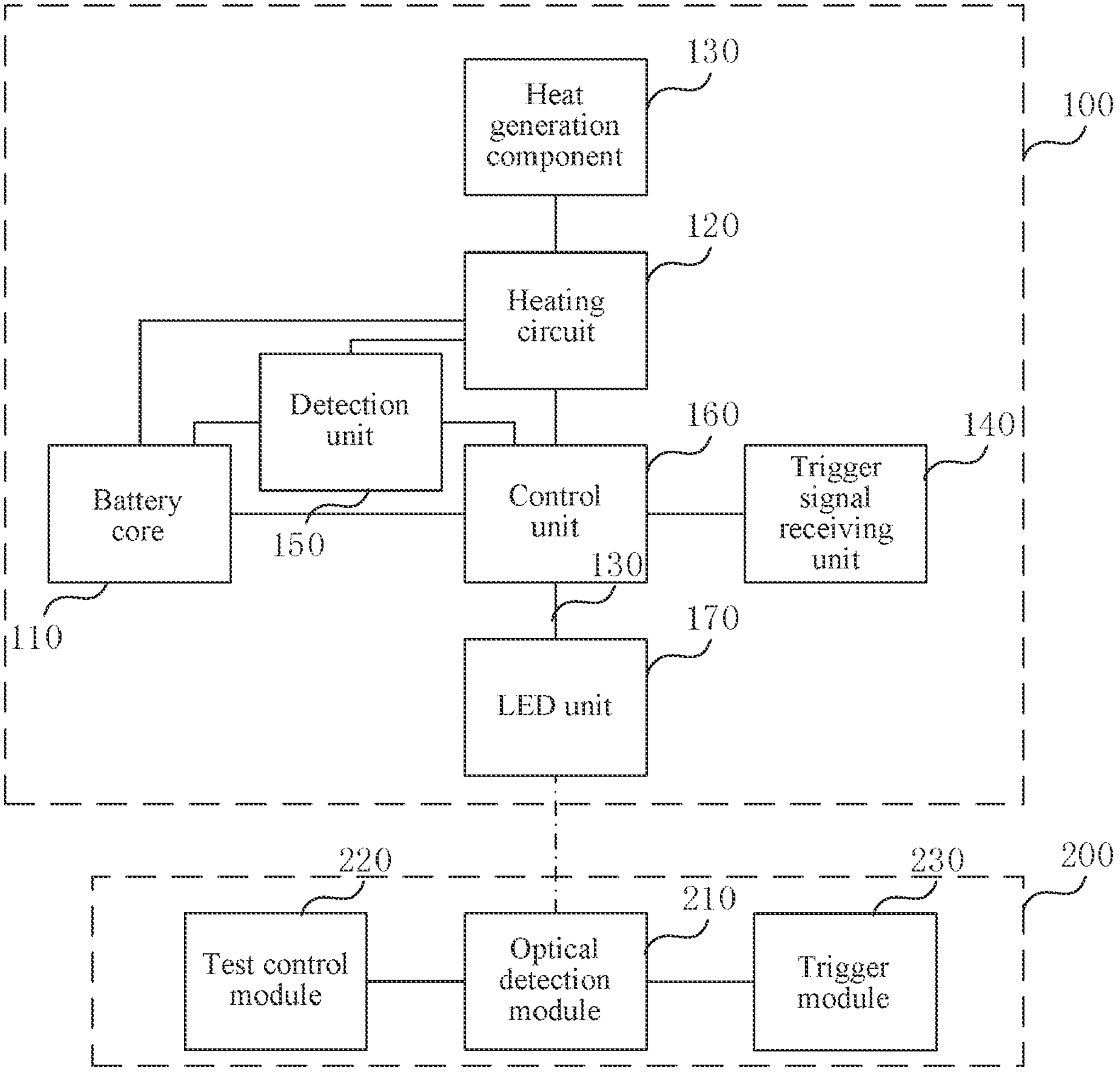
FIG. 5 is a schematic structural diagram of a test device according to another embodiment of this application.

In an embodiment, as shown in FIG. 5, the test device 200 further includes:

a trigger module 230, configured to input a trigger signal to the trigger signal receiving unit 140 of the aerosol vaporization device 100; and the test control module 220 being further configured to control the trigger module 230 to input the trigger signal to the trigger signal receiving unit 140.

For ease of tests, the trigger module 230 is set to automatically trigger the aerosol vaporization device 100 to start vaporization. When a test needs to be performed, the test control module 220 controls the trigger module 230 to input the trigger signal to the trigger signal receiving unit 140.

A type of the trigger module 230 may be selected according to a type of the trigger signal receiving unit 140 in the aerosol vaporization device 100. For example, if a main part of the trigger signal receiving unit 140 is a microphone, the trigger module 230 may be an apparatus that can change airflows, such as an automatic inhalation device.

Figure 6:
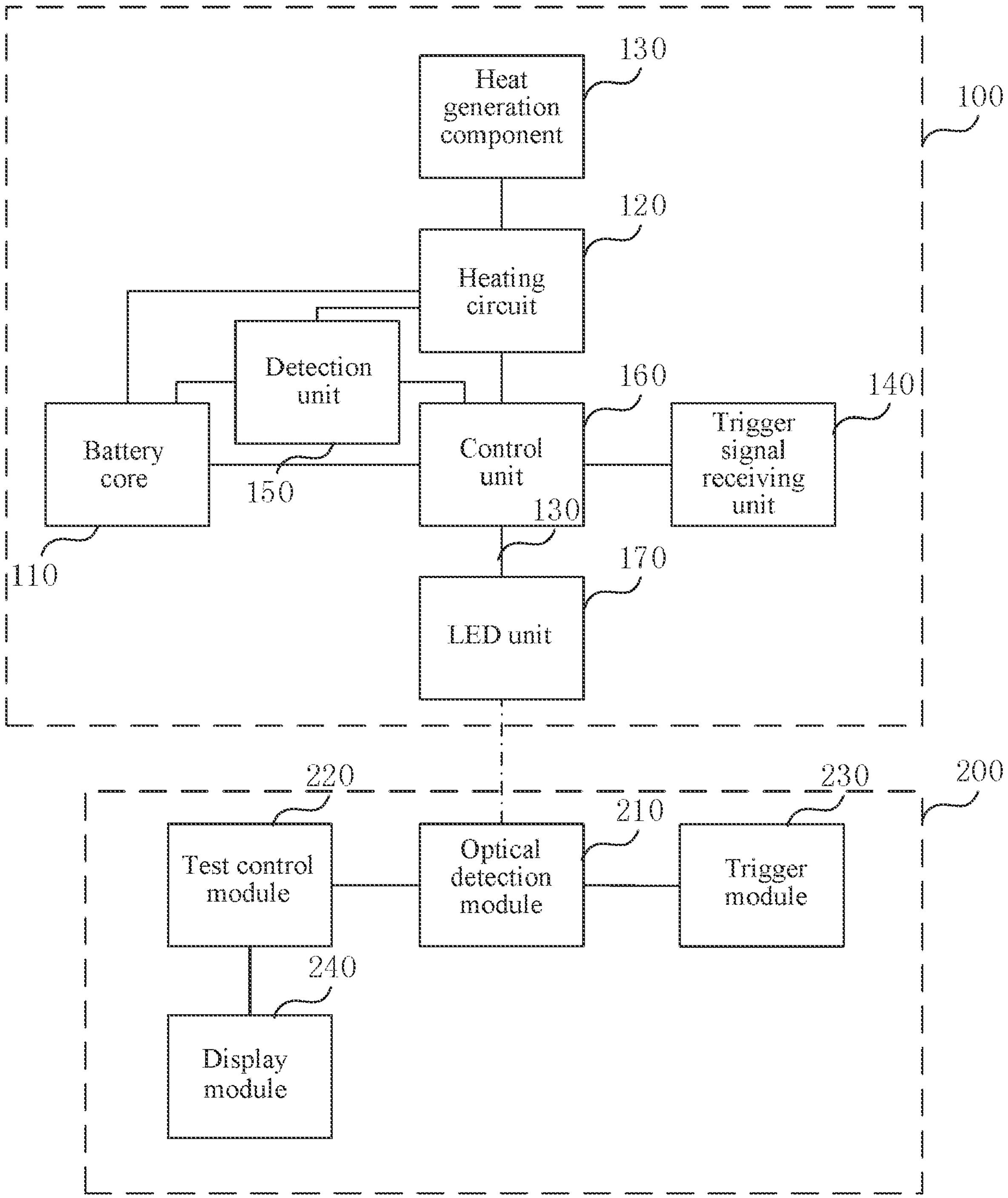
FIG. 6 is a schematic structural diagram of a test device according to still another embodiment of this application.

In an embodiment, as shown in FIG. 6, the test device 200 further includes:

a display module 240, configured to display the operating parameter transmitted by the test control module 220.

The display module 240 can intuitively display the operating parameter of the aerosol vaporization device 100 obtained through detection, to help a tester to obtain a test result.

Figure 7:
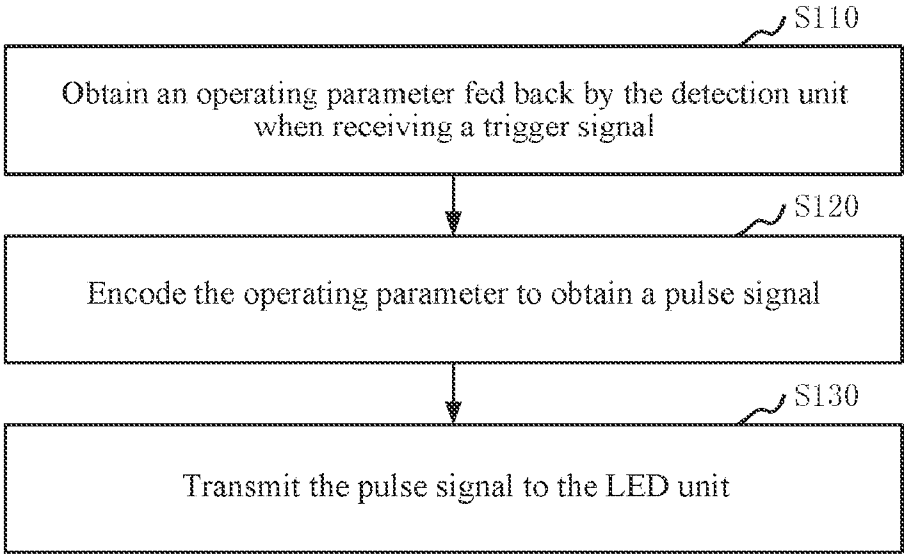
FIG. 7 is a schematic flowchart of an aerosol vaporization device control method according to an embodiment of this application.

In an embodiment, as shown in FIG. 7, an aerosol vaporization device control method is provided, applicable to the aerosol vaporization device 100 according to any one of the foregoing embodiments. The method includes:

Step S110: Obtain an operating parameter fed back by the detection unit 150 when receiving a trigger signal, where the detection unit 150 is configured to detect the operating parameter of the aerosol vaporization device 100; and the operating parameter includes at least one measured parameter of the aerosol vaporization device 100.

Step S120: Encode the operating parameter to obtain a pulse signal.

Step S130: Transmit the pulse signal to the LED unit 170, where the pulse signal is used for controlling the LED unit 170 to modulate a display level and output a pulse display level; the display level is used for representing an operating state of the aerosol vaporization device 100; and the pulse display level is provided to the test device 200 for detection and to obtain the operating parameter according to the pulse display level.

According to the aerosol vaporization device control method, when a trigger signal is received, an operating parameter detected by the detection unit 150 is obtained, a pulse signal is obtained after the operating parameter is encoded, the pulse signal is transmitted to the LED unit 170 to control the LED unit 170 to modulate a display level output by the LED unit, so that the LED unit 170 outputs a pulse display level to the test device 200 for detection, and the test device 200 obtains the operating parameter according to the pulse display level. By utilizing an LED display function owned by the aerosol vaporization device including the LED unit in combination with the operating parameter fed back by the detection unit, tests on the operating parameter can be implemented without additionally setting a set of specific test software for the aerosol vaporization device. That is, an operating parameter transmission function may be superimposed on the LED display function of the aerosol vaporization device.

For example, for an aerosol vaporization device including an inhalation state LED display function, when the user performs inhalation, a first LED of the aerosol vaporization device may light up, and after the inhalation stops, the first LED lights off. Therefore, the pulse signal corresponding to the operating parameter may be superimposed in the stage that the first LED lights up. In an embodiment, the first LED may light up gradually when the user performs inhalation and maintain highlighted for a period of time; and light off gradually after the inhalation is stopped. To help the test device to obtain the operating parameter according to the pulse display level, the pulse signal may be superimposed in the stage that the first LED is highlighted.

In another embodiment, the aerosol vaporization device further includes a charging state LED display function. A second LED may light up when the aerosol vaporization device is charged. For example, the second LED flasher in a charging state, the second LED is always on after the aerosol vaporization device is fully charged, and the second LED lights off after charging is stopped. Therefore, the pulse signal corresponding to the operating parameter may be superimposed on the stage that the second LED lights up.

Figure 8:
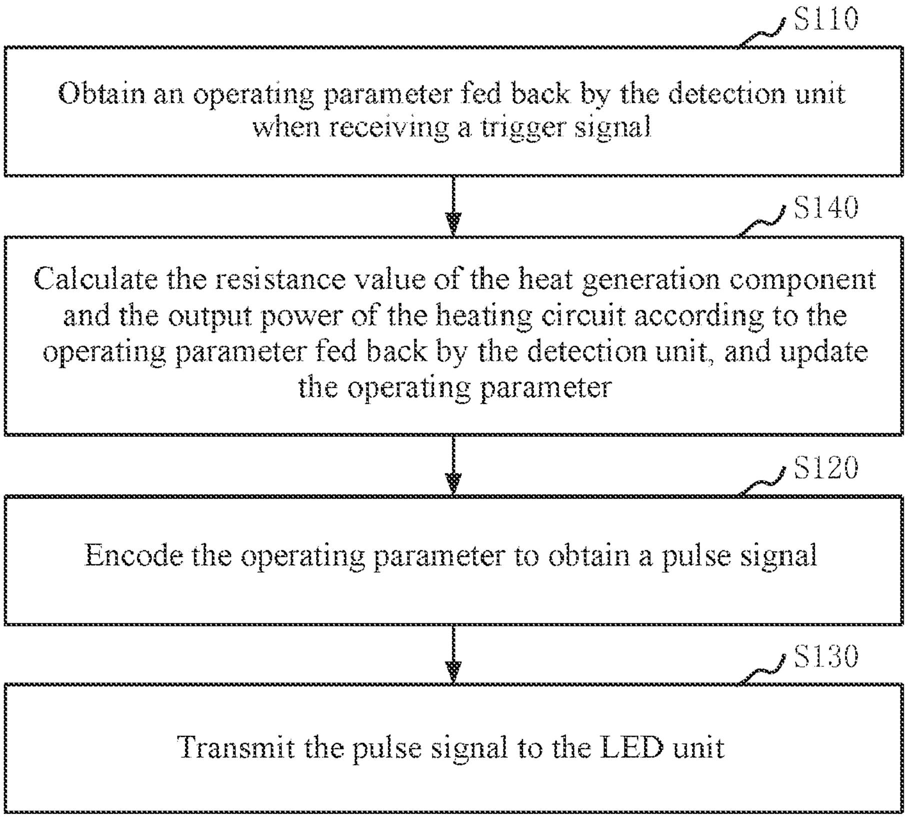
FIG. 8 is a schematic flowchart of an aerosol vaporization device control method according to another embodiment of this application.

In an embodiment, the operating parameter further includes a resistance value of the heat generation component 130 and/or an output power of the heating circuit 120. As shown in FIG. 8, the aerosol vaporization device control method further includes:

Step S140: Calculate the resistance value of the heat generation component 130 and the output power of the heating circuit 120 according to the operating parameter fed back by the detection unit 150, and update the operating parameter.

For a specific limitation on the aerosol vaporization device control method, reference may be made to the limitation on the aerosol vaporization device 100 above. Details are not described herein again.

In an embodiment, as shown in FIG. 9, an aerosol vaporization device test method is further provided, applicable to the test device 200 according to any one of the foregoing embodiments. The test method includes:

Step S210: Obtain a detection signal, where the detection signal is an electrical signal output by the optical detection module 210 according to the pulse display level output by the LED unit 170 of the aerosol vaporization device 100.

Step S220: Demodulate the detection signal to obtain a pulse signal corresponding to the pulse display level.

Step S230: Decode the pulse signal to obtain the operating parameter of the aerosol vaporization device 100.

According to the aerosol vaporization device test method, a detection signal output according to the pulse display level output by the LED unit 170 of the aerosol vaporization device 100 is obtained through the optical detection module 210; and the detection signal is demodulated to obtain a pulse signal corresponding to the pulse display level, and the pulse signal is then decoded to obtain the operating parameter of the aerosol vaporization device 100.

In an embodiment, as shown in FIG. 10, before the obtaining a detection signal, the test method further includes:

Step S240: Transmit a trigger control signal to the trigger module, where the trigger control signal is used for controlling the trigger module to input a trigger signal to the trigger signal receiving unit 140 of the aerosol vaporization device 100.

For a specific limitation on the aerosol vaporization device test method, reference may be made to the limitation on the test device 200 above. Details are not described herein again. It should be understood that, although the steps in the flowcharts of FIG. 7 to FIG. 10 are sequentially displayed according to indication of arrows, the steps are not necessarily sequentially performed in the sequence indicated by the arrows. Unless clearly specified in this specification, there is no strict sequence limitation on the execution of the steps, and the steps may be performed in another sequence. In addition, at least some steps in FIG. 7 to FIG. 10 may include a plurality of substeps or a plurality of stages. The substeps or the stages are not necessarily performed at the same moment, and instead may be performed at different moments. The substeps or the stages are not necessarily performed sequentially, and instead may be performed in turn or alternately with another step or at least some of substeps or stages of the another step.

Figure 11:
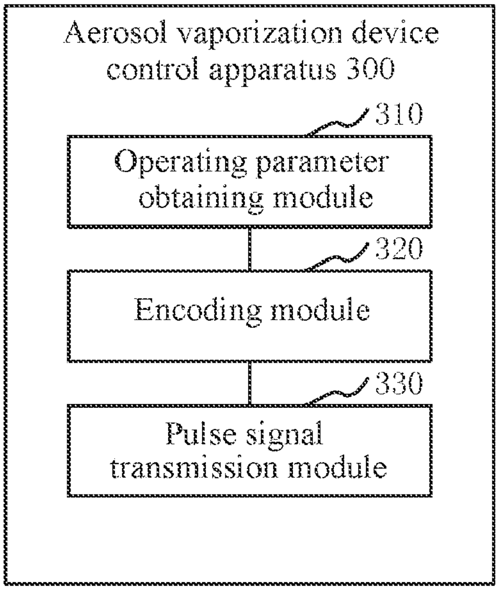
FIG. 11 is a structural block diagram of an aerosol vaporization device control apparatus according to an embodiment of this application.

In an embodiment, as shown in FIG. 11, an aerosol vaporization device control apparatus 300 is provided, applicable to the aerosol vaporization device 100 according to any one of the foregoing embodiments. The control apparatus 300 includes:

an operating parameter obtaining module 310, configured to obtain an operating parameter fed back by the detection unit 150 when receiving a trigger signal, where the detection unit 150 is configured to detect the operating parameter of the aerosol vaporization device 100; and the operating parameter includes at least one measured parameter of the aerosol vaporization device 100;

an encoding module 320, configured to encode the operating parameter to obtain a pulse signal; and a pulse signal transmission module 330, configured to transmit the pulse signal to the LED unit 170, where the pulse signal is used for controlling the LED unit 170 to modulate a display level and output a pulse display level; the display level is used for representing an operating state of the aerosol vaporization device; and the pulse display level is provided to the test device 200 for detection and to obtain the operating parameter according to the pulse display level.

In an embodiment, the operating parameter further includes a resistance value of the heat generation component 130 and/or an output power of the heating circuit 120. The aerosol vaporization device control apparatus 300 further includes:

a calculation module, configured to calculate the resistance value of the heat generation component 130 and the output power of the heating circuit 120 according to the operating parameter fed back by the detection unit, and update the operating parameter.

For a specific limitation on the aerosol vaporization device control apparatus, reference may be made to the limitation on the aerosol vaporization device control method above. Details are not described herein again. The modules in the foregoing aerosol vaporization device control apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules. It should be noted that, in the embodiments of this application, the module division is an example, and is merely logical function division, and there may be other division manners during actual implementation.

Figure 12:
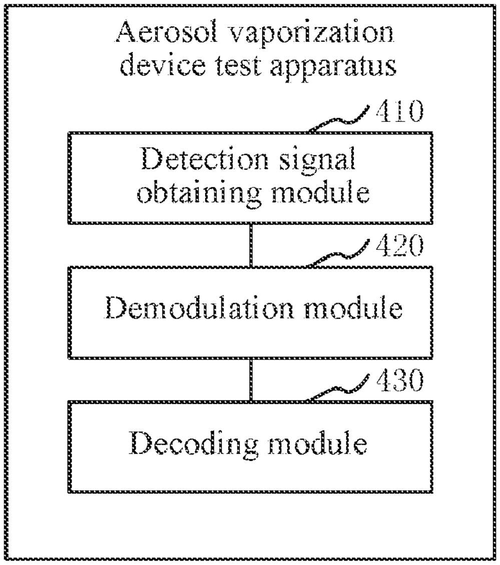
FIG. 12 is a structural block diagram of an aerosol vaporization device test apparatus according to an embodiment of this application.

In an embodiment, as shown in FIG. 12, an aerosol vaporization device test apparatus is further provided, applicable to the test device 200 according to any one of the foregoing embodiments. The test apparatus includes:

a detection signal obtaining module 410, configured to obtain a detection signal, where the detection signal is an electrical signal output by the optical detection module 210 according to the pulse display level output by the LED unit 170 of the aerosol vaporization device 100;

a demodulation module 420, configured to demodulate the detection signal to obtain a pulse signal corresponding to the pulse display level; and a decoding module 430, configured to decode the pulse signal to obtain the operating parameter of the aerosol vaporization device 100.

In an embodiment, the aerosol vaporization device 100 test apparatus further includes:

a trigger control signal transmission module, configured to transmit a trigger control signal to the trigger module, where the trigger control signal is used for controlling the trigger module to input a trigger signal to the trigger signal receiving unit 140 of the aerosol vaporization device 100.

For a specific limitation on the aerosol vaporization device 100 test apparatus, reference may be made to the limitation on the aerosol vaporization device test method above. Details are not described herein again. The modules in the foregoing aerosol vaporization device 100 test apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules. It should be noted that, in this embodiment of this application, the module division is an example, and is merely logical function division, and there may be other division manners during actual implementation.

In an embodiment, a computer device is provided, including a memory and a processor, the memory storing a computer program, the processor, when executing the computer program, implementing the following steps:

Step S110: Obtain an operating parameter fed back by the detection unit 150 when receiving a trigger signal, where the detection unit 150 is configured to detect the operating parameter of the aerosol vaporization device 100; and the operating parameter includes at least one measured parameter of the aerosol vaporization device.

Step S120: Encode the operating parameter to obtain a pulse signal.

Step S130: Transmit the pulse signal to the LED unit 170, where the pulse signal is used for controlling the LED unit 170 to modulate a display level and output a pulse display level; the pulse display level is provided to the test device 200 for detection and to obtain the operating parameter according to the pulse display level.

In an embodiment, the processor, when executing the computer program, further implements the following steps:

Step S140: Calculate the resistance value of the heat generation component 130 and the output power of the heating circuit 120 according to the operating parameter fed back by the detection unit, and update the operating parameter.

Figure 13:
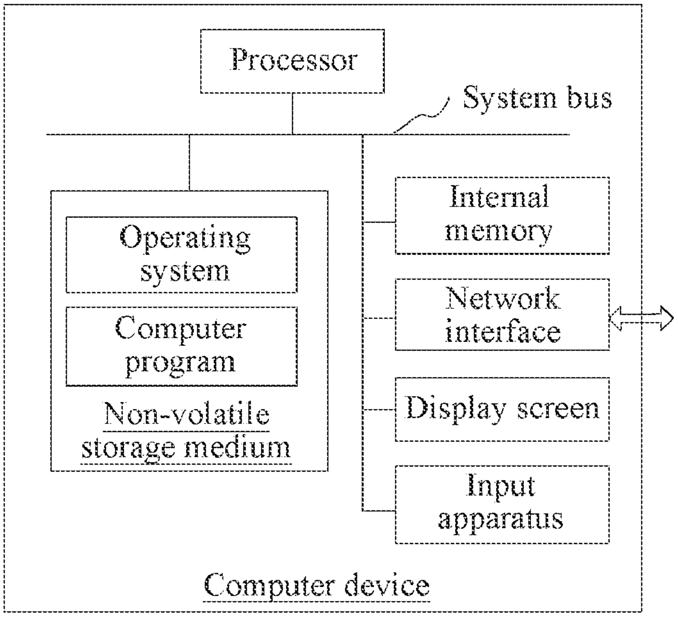
FIG. 13 is a diagram of an internal structure of a computer device according to an embodiment of this application.

In an embodiment, as shown in FIG. 13, a computer device is further provided, including a memory and a processor, the memory storing a computer program, the processor, when executing the computer program, implementing the following steps:

Step S210: Obtain a detection signal, where the detection signal is an electrical signal output by the optical detection module 210 according to the pulse display level output by the LED unit 170 of the aerosol vaporization device 100.

Step S220: Demodulate the detection signal to obtain a pulse signal corresponding to the pulse display level.

Step S230: Decode the pulse signal to obtain the operating parameter of the aerosol vaporization device 100.

In this embodiment, the computer device may be an independent computer, or may include an actual operating device applying one or more methods or the apparatus in one or more embodiments of this specification, and a diagram of an internal structure thereof is shown in FIG. 13. The computer device includes a processor, a memory, a communication interface, a display screen, and an input apparatus that are connected through a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The communication interface of the computer device is configured to communicate with an external terminal in a wired or wireless manner. The wireless communication may be implemented by WI-FI, an operator network, near field communication (NFC), or other technologies. The display screen of the computer device may be a liquid crystal display screen or an electronic ink display screen. The input apparatus of the computer device may be a touch layer covering the display screen, or may be a key, a trackball, or a touch pad disposed on a housing of the computer device, and may further be an external keyboard, a touch pad, or a mouse.

A person skilled in the art may understand that, the structure shown in FIG. 13 is merely a block diagram of a part of a structure related to a solution of this application and does not limit the computer device to which the solution of this application is applied. Specifically, the computer device may include more or fewer components than those in the figure, or some components may be combined, or a different component deployment may be used.

In an embodiment, the processor, when executing the computer program, further implements the following steps:

Step S240: Transmit a trigger control signal to the trigger module, where the trigger control signal is used for controlling the trigger module to input a trigger signal to the trigger signal receiving unit 140 of the aerosol vaporization device 100.

In an embodiment, a computer-readable storage medium is provided, storing a computer program, the computer program, when executed by a processor, causing the processor to implement the following steps:

Step S110: Obtain an operating parameter fed back by the detection unit 150 when receiving a trigger signal, where the detection unit 150 is configured to detect the operating parameter of the aerosol vaporization device 100; and the operating parameter includes at least one measured parameter of the aerosol vaporization device.

Step S120: Encode the operating parameter to obtain a pulse signal.

Step S130: Transmit the pulse signal to the LED unit 170, where the pulse signal is used for controlling the LED unit 170 to modulate a display level and output a pulse display level; the display level is used for representing an operating state of the aerosol vaporization device; and the pulse display level is provided to the test device 200 for detection and to obtain the operating parameter according to the pulse display level.

In an embodiment, the computer program, when executed by a processor, further causes the processor to implement the following steps:

Step S140: Calculate the resistance value of the heat generation component 130 and the output power of the heating circuit 120 according to the operating parameter fed back by the detection unit 150, and update the operating parameter.

In an embodiment, a computer-readable storage medium is provided, storing a computer program, the computer program, when executed by a processor, causing the processor to implement the following steps:

Step S210: Obtain a detection signal, where the detection signal is an electrical signal output by the optical detection module 210 according to the pulse display level output by the LED unit 170 of the aerosol vaporization device 100.

Step S220: Demodulate the detection signal to obtain a pulse signal corresponding to the pulse display level.

Step S230: Decode the pulse signal to obtain the operating parameter of the aerosol vaporization device 100.

In an embodiment, the computer program, when executed by a processor, further causes the processor to implement the following steps:

Step S240: Transmit a trigger control signal to the trigger module, where the trigger control signal is used for controlling the trigger module to input a trigger signal to the trigger signal receiving unit of the aerosol vaporization device.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, or an optical memory. The volatile memory may include a random access memory (RAM) or an external cache. For the purpose of description instead of limitation, the RAM is available in a plurality of forms, such as a static RAM (SRAM) or a dynamic RAM (DRAM).

In the description of this specification, description of reference terms such as "some embodiments", "other embodiments", or "ideal embodiments", means including specific features, structures, materials, or features described in the embodiment or example in at least one embodiment or example of this application. In this specification, exemplary descriptions of the foregoing terms do not necessarily refer to the same embodiment or example.

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An aerosol vaporization device, comprising:

a trigger signal receiving unit configured to receive a trigger signal;

a detection unit configured to detect an operating parameter, the operating parameter comprising at least one measured parameter of the aerosol vaporization device;

a control unit configured to obtain the operating parameter fed back by the detection unit when receiving the trigger signal transmitted by the trigger signal receiving unit and output a pulse signal after encoding the operating parameter; and a light-emitting diode (LED) unit configured to modulate a display level according to the pulse signal transmitted by the control unit and output a pulse display level, the display level representing an operating state of the aerosol vaporization device, the pulse display level being provided to a test device for detection and to obtain the operating parameter according to the pulse display level.

2. The aerosol vaporization device of claim 1, further comprising:

a heating circuit configured to drive a heat generation component to generate heat, wherein the control unit is configured to output a heating signal to the heating circuit when receiving the trigger signal, and wherein the heating signal is used to control the heating circuit to drive the heat generation component to generate heat.

3. The aerosol vaporization device of claim 1, wherein the control unit is configured to control the LED unit to output the display level when receiving the trigger signal.

4. The aerosol vaporization device of claim 1, wherein the pulse signal comprises a high-frequency pulse signal.

5. The aerosol vaporization device of claim 4, wherein the operating parameter comprises a resistance value of the heat generation component and/or an output power of the heating circuit, and wherein the resistance value of the heat generation component and the output power of the heating circuit are calculated by the control unit according to the operating parameter fed back by the detection unit.

6. The aerosol vaporization device of claim 4, wherein the trigger signal receiving unit comprises a microphone.

7. A test device configured to test the aerosol vaporization device of claim 1, the test device comprising:

an optical detection module configured to detect the pulse display level output by the LED unit of the aerosol vaporization device and output a detection signal according to the pulse display level; and a test control module configured to receive the detection signal transmitted by the optical detection module and obtain the operating parameter of the aerosol vaporization device according to the detection signal.

8. The test device of claim 7, further comprising:

a trigger module configured to input a trigger signal to the trigger signal receiving unit of the aerosol vaporization device, wherein the test control module is configured to control the trigger module to input the trigger signal to the trigger signal receiving unit.

9. The test device of claim 7, further comprising:

a display module configured to display the operating parameter transmitted by the test control module.

10. An aerosol vaporization device control method, applicable to the aerosol vaporization device of claim 1, the method comprising:

obtaining an operating parameter fed back by the detection unit when receiving a trigger signal, the detection unit being configured to detect the operating parameter of the aerosol vaporization device, the operating parameter comprising at least one measured parameter of the aerosol vaporization device;

encoding the operating parameter to obtain a pulse signal; and transmitting the pulse signal to the LED unit, the pulse signal controlling the LED unit to modulate a display level and output a pulse display level, the display level representing an operating state of the aerosol vaporization device, the pulse display level being provided to a test device for detection and to obtain the operating parameter according to the pulse display level.

11. The aerosol vaporization device control method of claim 10, wherein the operating parameter comprises a resistance value of the heat generation component and/or an output power of the heating circuit, wherein the method further comprises:

calculating the resistance value of the heat generation component and the output power of the heating circuit according to the operating parameter fed back by the detection unit.

12. An aerosol vaporization device test method, applicable to the test device of claim 7, the method comprising:

obtaining a detection signal comprising an electrical signal output by the optical detection module according to the pulse display level output by the LED unit of the aerosol vaporization device;

demodulating the detection signal to obtain a pulse signal corresponding to the pulse display level; and decoding the pulse signal to obtain the operating parameter of the aerosol vaporization device.

13. The aerosol vaporization device test method of claim 12, wherein, before the obtaining a detection signal, the method further comprises:

transmitting a trigger control signal to the trigger module to control the trigger module to input a trigger signal to the trigger signal receiving unit of the aerosol vaporization device.

14. An aerosol vaporization device control apparatus, applicable to the aerosol vaporization device of claim 1, the apparatus comprising:

an operating parameter obtaining module configured to obtain an operating parameter fed back by the detection unit when receiving a trigger signal, the detection unit being configured to detect the operating parameter of the aerosol vaporization device, the operating parameter comprising at least one measured parameter of the aerosol vaporization device;

an encoding module configured to encode the operating parameter to obtain a pulse signal; and a pulse signal transmission module configured to transmit the pulse signal to the LED unit, the pulse signal controlling the LED unit to modulate a display level and output a pulse display level, the display level representing an operating state of the aerosol vaporization device, the pulse display level being provided to a test device for detection and to obtain the operating parameter according to the pulse display level.

15. An aerosol vaporization device test apparatus, applicable to the test device of claim 7, the apparatus comprising:

a detection signal obtaining module configured to obtain a detection signal comprising an electrical signal output by the optical detection module according to the pulse display level output by the LED unit of the aerosol vaporization device;

a demodulation module configured to demodulate the detection signal to obtain a pulse signal corresponding to the pulse display level; and a decoding module configured to decode the pulse signal to obtain the operating parameter of the aerosol vaporization device.

16. A computer device, comprising:

a memory storing a computer program; and a processor that when executing the computer program implements the method of claim 10.

17. One or more non-transitory computer-readable storage mediums having processor-executable instructions stored thereon, wherein the processor-executable instructions, when executed, facilitate the method of claim 10.

* * * * *